United States Patent
Hiley

(10) Patent No.: US 8,899,185 B2
(45) Date of Patent: Dec. 2, 2014

(54) POSITIONING DEVICE

(75) Inventor: Richard James Hiley, Chinnor (GB)

(73) Assignee: Ambic Equipment Limited, Witney (GB)

( * ) Notice: Subject to any disclaimer, the term of this patent is extended or adjusted under 35 U.S.C. 154(b) by 42 days.

(21) Appl. No.: 13/634,282

(22) PCT Filed: Mar. 11, 2011

(86) PCT No.: PCT/GB2011/050482
§ 371 (c)(1),
(2), (4) Date: Sep. 12, 2012

(87) PCT Pub. No.: WO2011/114138
PCT Pub. Date: Sep. 22, 2011

(65) Prior Publication Data
US 2013/0000562 A1    Jan. 3, 2013

(30) Foreign Application Priority Data

Mar. 15, 2010 (GB) .................................. 1004243.0
Feb. 17, 2011 (GB) .................................. 1102726.5

(51) Int. Cl.
| | | |
|---|---|---|
| A01K 29/00 | (2006.01) | |
| A01K 1/12 | (2006.01) | |
| A01J 7/04 | (2006.01) | |
| A01K 15/04 | (2006.01) | |

(52) U.S. Cl.
CPC ... *A01K 1/12* (2013.01); *A01J 7/04* (2013.01); *A01K 15/04* (2013.01)
USPC .......................... 119/651; 119/670; 119/14.18

(58) Field of Classification Search
CPC .............. A01K 1/12; A01K 15/04; A01J 7/04
USPC .......... 119/14.01, 14.02, 14.03, 14.04, 14.08, 119/14.18, 600, 601, 602, 603, 604, 650, 119/651, 665, 670, 671
See application file for complete search history.

(56) References Cited

U.S. PATENT DOCUMENTS

| | | | | |
|---|---|---|---|---|
| 1,750,575 | A | * | 3/1930 | Cubberley ...................... 211/11 |
| 3,393,822 | A | * | 7/1968 | Freeman ........................... 220/8 |

(Continued)

FOREIGN PATENT DOCUMENTS

| | | |
|---|---|---|
| DE | 102007004539 A1 | 7/2008 |
| GB | 1405225 A | 9/1975 |

(Continued)

OTHER PUBLICATIONS

Anonymous, "A positioning device for a milking installation", Oct. 21, 2004, pp. 1-3.

(Continued)

*Primary Examiner* — Rob Swiatek
*Assistant Examiner* — Ebony Evans
(74) *Attorney, Agent, or Firm* — Meunier Carlin & Curfman, LLC

(57) ABSTRACT

The present invention relates to a positioning device (10) that encourages animals to stand in a desired position to enable efficient and effective treatment of a part of their body. The positioning device (10) of the invention may optionally comprise one or more spraying nozzles (56) adapted for spraying the teats of the animal with a treatment chemical either pre- or post-milking.

5 Claims, 13 Drawing Sheets

(56) References Cited

U.S. PATENT DOCUMENTS

| | | | |
|---|---|---|---|
| 3,554,166 A | | 1/1971 | Belden |
| 4,114,288 A | * | 9/1978 | Fowler ............................. 34/93 |
| D263,191 S | * | 3/1982 | Moore ........................... D7/504 |
| 4,742,922 A | * | 5/1988 | Demarest, Jr. .................. 211/43 |
| 5,101,770 A | * | 4/1992 | Stevenson ..................... 119/651 |
| D461,475 S | * | 8/2002 | Hu ............................... D14/408 |
| 7,347,165 B2 | * | 3/2008 | Yoerg ........................... 119/671 |
| 2010/0242845 A1 | | 9/2010 | Pharaoh |

FOREIGN PATENT DOCUMENTS

| | | |
|---|---|---|
| WO | 2008/089976 A1 | 7/2008 |
| WO | 2009/113884 A2 | 9/2009 |

OTHER PUBLICATIONS

International Search Report and Written Opinion for PCT/GB2011/050482, mailed Jul. 28, 2011.

* cited by examiner

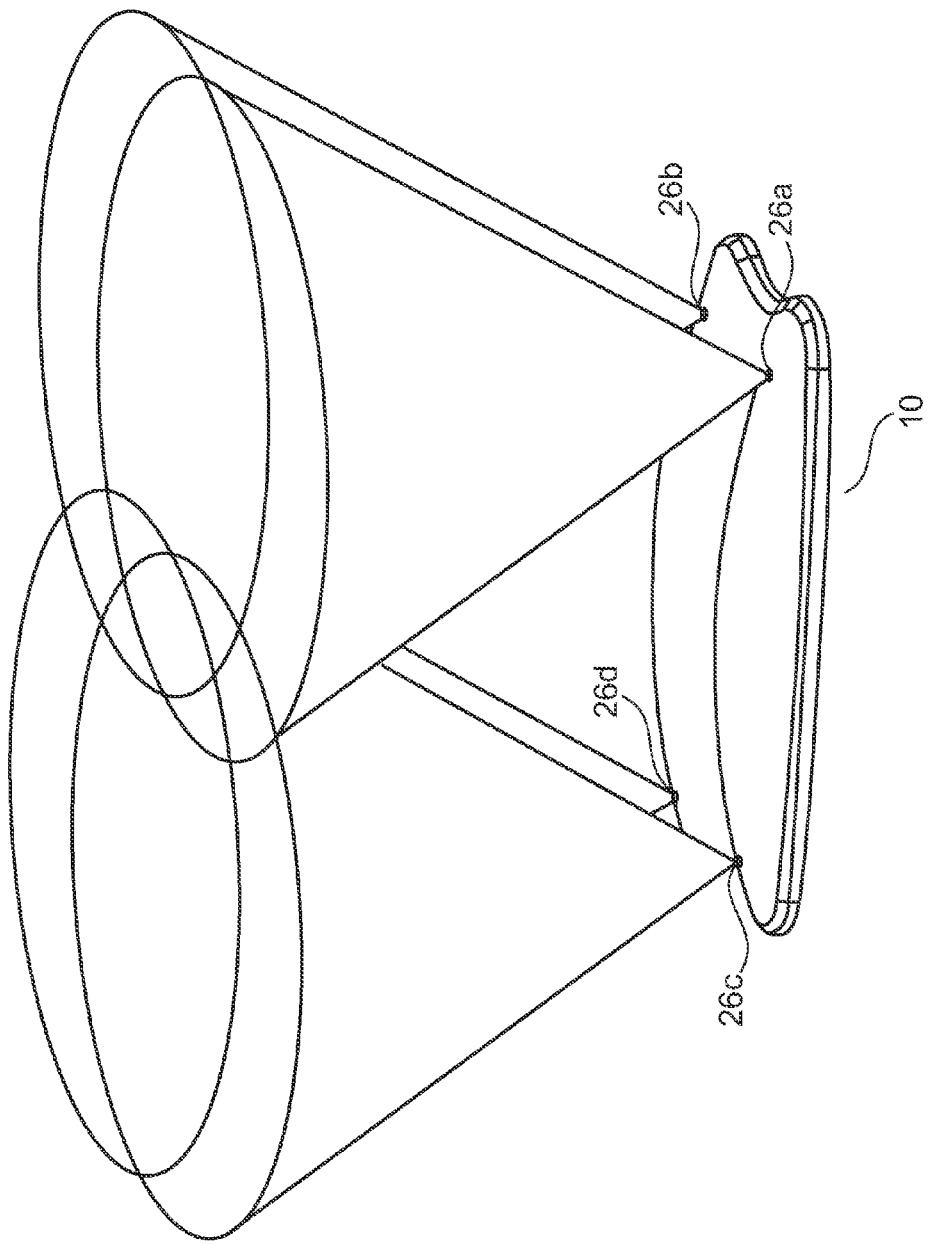

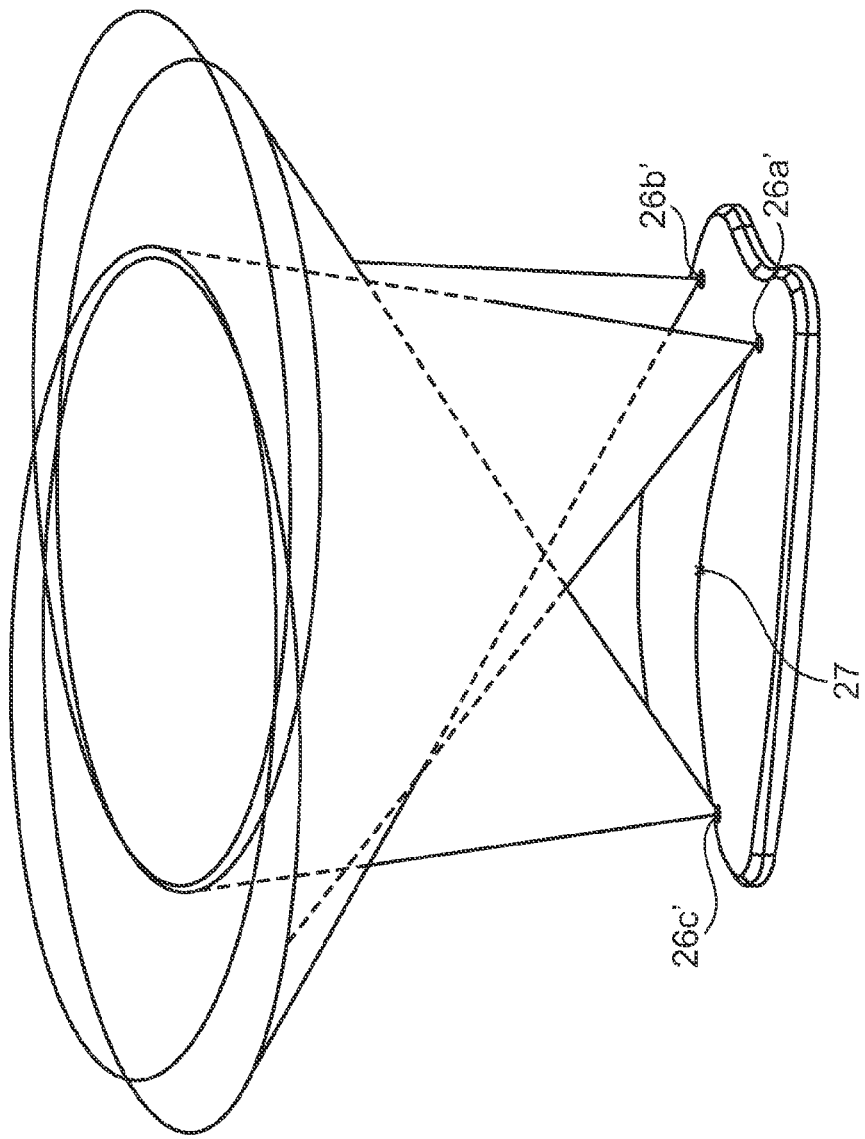

POSITIONING DEVICE

FIELD OF THE INVENTION

The present invention relates to a positioning device that encourages animals to stand in a desired position to enable efficient and effective treatment of a part of their body.

BACKGROUND OF THE INVENTION

In order to maintain the health and welfare of milk producing animals, as well as the quality of their milk, it is very important that their udders and teats are kept clean and healthy. In particular, the bacteria that cause mastitis infections must not be allowed to proliferate and contaminate the milk harvesting equipment, thus risking the transfer of pathogens from animal to animal. To guard against this problem it is well known to treat the teats of animals with a liquid, such as a liquid disinfectant or a washing solution, either immediately before and/or immediately after milking. In the case of a pre-milking treatment application the aim is primarily to remove foreign matter and kill the bacteria present on the outside of the teat before milking. In the case of a post-milking treatment, it has been found beneficial to apply a sanitising solution and in some instances also a barrier liquid to provide a protective film that remains on the teat for some time and that seals and protects the teat end from mastitis causing bacteria. To ensure that such treatments are effective at controlling the bacteria, it is crucial that each teat is entirely coated with the liquid, and this requires the dairyman to maintain a high level of skill whilst operating the treatment process; unfortunately, for some methods of treatment this becomes arduous, especially in cases where the animal herd size is large.

Various different systems are used commercially to apply a treatment composition to the teats of a milk producing animals. One example involves using a "dip cup" container that holds an amount of the treatment composition and into which each teat is dipped. This type of treatment system has been used with liquid and foam based treatment compositions and has the advantage that a reasonably low level of operator skill is needed to make sure each teat is uniformly covered with the treatment composition. However, the use of "dip cups" is a very labour intensive process. As an alternative, the use of a system involving spraying treatment chemicals onto the udders has become popular in some countries, particularly where herd sizes are very large. Spraying has the advantage that it is much faster than dipping the teats individually into the dip cup, but much greater skill and attention is needed to ensure that all four teats are fully and evenly coated, for example there must be no shadowing effects caused by spraying the outside face of one teat and missing to inside face of an adjacent teat. This is true for both hand held and automated spraying systems.

It is known that full and even coverage of animal teats can be more easily achieved if the animal stands with its back legs slightly splayed; this has the advantage that it improves the position of the milking cluster (the cups of the milking machine that are placed over the teats to extract the milk) and presents the teats in the most favourable way for spraying. Various positioning devices that encourage the animal to stand in the desired way are already known. For example the "Wet-IT Wave"® as depicted in Australian Registered Design 0213/2004 has an uneven top profile which dissuades the animal from treading on it, but encourages her to splay her hind legs either side of it. However, the Wet-IT Wave® has several notable disadvantages. Firstly, any slurry and excess treatment liquid will accumulate in the flat valley region lying along the centre line of the device and this will need to be frequently washed out. Secondly, the Wet-IT Wave® has no means for spraying teats therefore it is necessary to involve separate spraying apparatus, for example by spraying the teats using a hand held spray gun or automatically, using an automated teat sprayer. However even with the Wet-IT Wave® positioning device, problems can arise as manual spraying still needs a skilled operator to ensure complete coverage of the teats and typical automated spraying involves a complex system that directs a spray arm either between the cows legs or from behind the cow. The latter arrangement means that the spray nozzles are quite some distance from the target teats, thus making it difficult to spray the teats accurately and to compensate excess treatment liquid is used to increase the chance of hitting the teats with the spray.

Other prior art such as U.S. Pat. No. 3,554,166 describes a spraying unit having a convex domed exterior surface through which the treatment fluids are sprayed onto the udder of a dairy animal via a plurality of spray nozzles. Although combining a positioning device with an ability to spray the teats, this unit has the disadvantage that it consumes an extremely high amount of treatment fluid: in use the whole volume of the dome fluid chamber 34 is full of treatment fluid prior to it exiting through spray nozzles 23. Also, this prior art describes an arrangement whereby, the spray nozzles 23 are sited in concave nozzle cavities 27. This has the disadvantage that they will fill with excess treatment fluid and slurry as it runs down the outside of the domed exterior surface, and this would contaminate and block the nozzles.

The design representations in recent New Zealand Registered Design 411943 also illustrate a moulding for a teat spray nozzle mounting which may be used to encourage the animal being milked to stand in a favourable position. In this design, the moulding has a central raised ridge portion, on which two spray nozzles are located, and three separate concave portions. It is believed that in practice these concave portions will accumulate excess treatment spray and slurry, and this will again need to be washed away to avoid contamination. Also, the present Applicant has found that the fact that the spray nozzles are located along the central raised ridge portion means that the device does not allow sufficient room for the milking cluster to hang down unimpeded, particularly when milking animals with large udders.

The Applicant has determined that the efficiency of spraying can be maximised, both in terms of making sure all of the teats are effectively covered, and also by minimizing the amount of spray that misses the teats through being off target, if the spraying system has one or more of the following features: i) a positioning device to encourage the animal to stand with its hind legs slightly splayed; ii) one or more spray nozzles on the positioning device; iii) a positioning device which is designed to prevent spray and slurry pooling on its surface thereby avoiding the risk of contaminating the spray nozzles; iv) a positioning device that has its lowest point in the middle to give maximum depth for the milking cluster to hang unimpeded under the animal; v) spraying the animals when they are stationary-exit race spraying systems are found to be wasteful of spray chemical as well as producing inefficient teat coverage because trying to spray a moving target is particularly challenging; vi) ensuring that the spray nozzles are located directly under the udder and teats and not to one side or behind the animal and vii) ensuring that the one or more spray nozzles are positioned proud of the surface of the positioning device to reduce the risk that the nozzles become clogged and contaminated by over-spray (i.e. the spray that misses the target teats) and slurry.

Thus the aim of the present invention is to provide a positioning device that may optionally include spray nozzles, which has an aerodynamic shape to keep its top surface, and any spray nozzles, free of slurry and excess spray chemical and therefore free of contamination. Another aim is to provide a positioning device that allows a suitable depth for the milking cluster to hang unimpeded under the animal to achieve good cluster positioning and therefore a good milk-out. A further aim is to provide a positioning device that has spray nozzles that are controllable independently of one another and which provide a spraying pattern that uses the minimum amount of spray liquid to produce a full and even coverage of all four teats without suffering from shadowing effects. In this way not only can chemical costs be kept to a minimum but it will also reduce the environmental impact of using the spraying liquids. This is a particular issue with poorly directed spraying systems, mentioned above, as these tend to use an excess amount of spray liquid in the hope that at least some of it will hit the desired target, however, in reality most misses and needs to be disposed of into the slurry handling system. It is also an aim to design a positioning device that can be made using simple moulding techniques and preferably easily adapted to alter the separation between the spray nozzles to achieve optimum teat coverage for both large and small animals. These and other advantages are provided by the present invention, as discussed below.

In respect of the present invention all references to the treatment chemical shall be interpreted to include chemical in liquid and/or foamed form.

In a first embodiment, the present invention provides a positioning device comprising a base plate with at least one pair of raised portions upstanding from the base plate and one or more valley regions located between the raised portions in each pair of raised portions; wherein the profile of each of the raised portions, and the profile of the one or more of the valley regions, is convex.

The convex profile of the at least one pair of raised portions and of the one or more valley regions has been carefully designed to be on the one hand, uneven enough to be off-putting to the animal to prevent it from standing on the device, and yet sufficiently "aerodynamic" to ensure that the positioning device is kept free from spray chemical and slurry. The convex shape encourages the slurry and spray chemical to run off the device easily and not to "pool" anywhere on it.

In a second embodiment, the present invention provides a positioning device comprising a first pair of raised portions, a second pair of raised portions and one or more valley regions located between the raised portions in at least one of the first and/or second pair of raised portions, wherein the profile of each of the raised portions and the profile of the one or more valley regions is convex.

Preferably one of the one or more valley regions provides a common valley between all of the pairs of raised portions and notable benefits for the positioning of the milking cluster can be recognised when the common valley region is aligned with a central axis of the positioning device since this arrangement ensures sufficient depth is provided for the milking cluster to hang down freely under the animal and not be impeded by the positioning device. This arrangement achieves good cluster positioning to facilitate good 'milk out'. Thus, in a third embodiment, the positioning device of the present invention preferably has one or more pairs of raised portions with a common valley portion between the raised portions in each pair. When the common valley region is aligned with a central axis of the positioning device, the device is lowest in a line along its middle.

In a preferred fourth embodiment, the present invention provides a positioning device in which the base plate comprises forward and rearward facing ends and wherein the raised portions comprise a pair of elongate and parallel raised portions which form two raised ridges that run towards the forward facing end in one direction and towards the rearward facing end in the other direction, wherein a valley is located between the two raise ridges and further wherein the profile of each of the two raised ridges and the profile of the valley located between the two raised portions is a convex arc running in the direction between the forward facing and rearward facing end portions.

In a fifth embodiment, the positioning device of the present invention may optionally further comprise one or more spray nozzles through which treatment chemical may be sprayed onto the teats and preferably the one or more spray nozzles are positioned proud of the upper surface of the positioning device. This keeps them free from contamination and blockage.

The design of the positioning device of the present invention is adapted for use in any existing or new milking parlours including the more traditional static "abreast" milking parlours, the newer rotary platform milking systems and more recent robotic or automatic milking systems (AMS). The use of the positioning device according to the invention in combination with a rotary platform milking system is especially preferred because the animal teats can be sprayed immediately after milking whilst the animal is still on the rotary platform, i.e. before the sphincter has closed.

To streamline the design of all embodiments of the present invention, the underside of the positioning device preferably includes one or more channels to direct treatment chemical supply conduits that convey treatment chemical from one or more remote reservoir containers to the at least one spray nozzle. The underside of the positioning device may also comprise ribs; these assist to strengthen the device and prevent it from breaking or being damaged should an animal accidentally stand on it.

In the case where the positioning device is employed in combination with a rotary platform milking system, the remote reservoir containers can be conveniently located on the rotary platform itself if required to facilitate delivery of the treatment chemical to the at least one spray nozzle. Alternatively, the remote reservoir containers can be located off the rotary platform and one or more supply conduits conveying the treatment chemical from the reservoir to the one or more nozzles, can be directed through a rotary gland provided in the centre of the platform. Such arrangements ensure that the supply conduits turn with the platform without the need for an elaborate rotation means which would be necessary to prevent the conduits becoming entangled as the platform turns.

The positioning device of the present invention may be designed to facilitate the spraying of more than one separate chemical and this makes the device useful for spraying both pre- and post-milking treatment chemicals. Preferably, the design of the positioning device of the present invention will include the ability to spray a first chemical from some or all of the spray nozzles, and to spray a second chemical from some or all of the spray nozzles. Preferably the spray nozzles may be activated to spray in any order and either concurrently or sequentially with one another.

The animal positioning device of the present invention is particularly advantageous if the one or more spray nozzles are located on one or all of the raised portions. In a particularly preferred sixth embodiment, the positioning device according to the present invention comprises two spray nozzles, one of which is located on a raised portion positioned towards the forward facing end of the positioning device and the other nozzle is located on a raised portion positioned towards the rearward facing end of the positioning device. Alternatively, in a seventh embodiment, one of the spray nozzles may be located on a first raised portion and positioned towards one end of the positioning device and the other spray nozzle may be located on a second raised portion and positioned towards the same end of the positioning device. In a further alternative eighth embodiment, the positioning device comprises two convex raised portions, with a convex central valley region located between the two convex raised portions, and four spray nozzles; wherein two nozzles are located on each raised portion. Advantageously, the spray nozzles may be associated with control equipment to activate one or more of the nozzles to spray in any combination at a time. For example, all nozzles may be activated to spray concurrently, separately or in any combination of two or more at a time. In an alternative arrangement, just one of the spray nozzles on one raised portion may be activated to spray from behind the teats and just one of the spray nozzles on the other raised portion may be activated to spray from in front of the teats. In the case where one or more nozzles are positioned towards a forward end of the positioning device on one or both of two opposing raised portions that are separated by a common valley region, and one or more nozzles are positioned towards the rearward end of the positioning device on one or both of the same or different two opposing raised portions, the nozzles may be activated to spray in a diagonal spray pattern. One way to achieve this may involve at least one nozzle towards the forward end on one side of the common valley region can be caused to spray either concurrently or consecutively with at least one nozzle towards the rearward end on the other side of the common valley region. The Applicant has found the diagonal spray pattern to be highly advantageous and in fact the optimum way to achieve the best complete coverage and most even distribution of spray chemical on animal teats, without shadowing or other problems, yet whilst using a minimum amount of spray chemical.

If chemical usage is not an issue or in the case where it is desired to use separate nozzles to spray different chemicals, then an analogous diagonal spray pattern can be employed by causing other spray nozzles to spray the front and rear teats from the alternate opposing sides of the common valley region.

Any type of spraying nozzle may be used in the positioning device of the present invention and typically, using two or more spray nozzles gives better coverage than a single nozzle. However, to optimise the teat coverage for minimum chemical consumption, it is necessary to consider a number of factors, such as the size and velocity of the droplets produced by a particular nozzle and also whether the nozzle produces a solid-cone or a hollow-cone spray pattern; a solid-cone pattern is generally more beneficial.

Moreover, the selected nozzles may be static or adapted to rotate and/or they may be oriented to spray at any suitable angle. For example, on a positioning device of the present invention the one or more spray nozzles may be oriented to point directly upwards so that the treatment chemical is sprayed in a direction substantially perpendicular to the horizontal plane of the base plate. However, in a preferred arrangement, one or more of the nozzles is oriented to be inclined at an oblique angle, so that the treatment chemical is sprayed at an oblique angle towards the animal teats. The overall shape of the spray pattern produced by the one or more spray nozzles may be varied depending on how many nozzles at a time are actuated to spray, their relative positions on the positioning device, whether the nozzles produce solid- or hollow-cone spray patterns, the precise oblique angle at which each of the spray nozzles is oriented, the viscosity of the treatment chemical and the pressure at which the treatment chemical is delivered to the nozzles. A highly preferred arrangement has at least one nozzle towards the forward end of the positioning device on one side of the common valley region which may be activated to spray either concurrently or consecutively with at least one other nozzle located towards the rearward end on the other side of the common valley region, to produce an overall spray pattern that runs diagonally across the positioning device from its forward to its rearward ends. This "diagonal spray pattern" can be further optimised by using a combination of solid-cone nozzles set at an oblique angle to produce an elliptical spray pattern.

It has been found that the spray-pattern is improved when the control equipment which activates the one or more spray nozzles, is located as close as possible to the spray nozzles. This minimises the pressure drop which occurs at the instant the control equipment is activated to actuate supply of the treatment chemical to the nozzles; which pressure drop adversely affects the shape of the spray-pattern. However, siting the control equipment on the rotary platform presents its own technical challenge as it is necessary to ensure the solenoid does not suffer damage by being in close proximity with various fluids including slurry, urine etc. In a convenient arrangement, the present invention overcomes these difficulties by the positioning device having a space provided in the ribs/channels on its underside, which space could be sealed, in which to accommodate a solenoid valve or other spray control device, thereby using the positioned device itself to protect the solenoid valve/control device.

The Applicants have found that a further way to minimise the effects of the drop in pressure that occurs upon activation of the control equipment, is to pulse actuate the equipment, that is to switch it on, then rapidly off, then rapidly on again each time a nozzle is actuated to spray. The idea of having bursts of spraying is to interrupt the spray sequence at the point when the pressure drop reduces the quality of the spray pattern so as to give time for the pressure to recover before the spray is recommenced. There is also a further benefit in using the pulse spray technique; at the first spray the animal will tend to move so by having two bursts of spray increases the teat coverage.

Although it is important to ensure sufficient pressure is maintained to produce an optimal spray pattern, it has been found unnecessary to employ an excessively high pressure. In a preferred arrangement the present invention is capable of operating at a pressure of less than 175 psi.

To simplify cost of production, the positioning device according to the present invention may be injection moulded either as a single item or in two or more component parts. Preferably these component parts are adapted to fit together either directly or indirectly. The advantages of making the device in two or more parts is that it is possible, in the case of a device with a symmetrical design, to produce a single component part which is adapted to fit together with a second identical single component part and thereby make the positioning device. Fixing the two component parts together may be achieved using adhesive, clips, screws or protrusions on a first part of a first component that mate with recesses on a second part of an identical second component. Making the positioning device in two or more parts not only reduces the size of the tool needed for injection moulding, but also provides the opportunity to use one or more extension or spacer pieces to elongate the device, thereby increasing the separation between the spray nozzles and adapting it for larger animals.

The present invention also provides a method of spraying the teats of an animal with a treatment liquid, comprising to steps of:
a) positioning an animal positioning device having at least one spray nozzle as described above beneath the teats of an animal to be sprayed; and
b) providing a source of treatment chemical to the animal positioning device and causing the chemical to be sprayed from the at least one spray nozzle onto the teats being treated.

Preferably the treatment chemical is caused to be sprayed by means of, for example, an electronic signal from the ACR or automatic cup remover (part of the milking machine), a signal from the milking machine, a finger switch on the rotary platform, or a signal generated by the integrated herd management system which controls the milking process.

It is possible to use any conventional fixing means to fix the positioning device according to the present invention in the desired location under the udder of the animal being milked. Examples of suitable fixing means may include bolts and screws through pre-formed holes in the positioning device and the floor of the milking parlour or the rotary platform, alternately clips or adhesive may be used or bayonet type fixings. Further alternatively, the positioning device of the present invention may be retro-fitted and/or removably fitted in a desired location, e.g. on the floor of a milking parlour or on the table of a rotary platform, by means of suitable clips or other fixing arrangements. In a preferred embodiment, a foot plate may be fixed, for example by being glued, bolted or screwed, in the desired location, and the positioning device fitted and/or removably fitted to the foot plate using clips or other fixing arrangements.

The benefits of using the above foot plate system include: being able to retro-fit a positioning device to an existing rotary platform milking system; being able to remove a fitted positioning device to gain access underneath it for example to allow maintenance; being able to replace a positioning device should it become damaged or need updating.

The footplate may be formed as a plastics moulding or from metal and will comprise first attachment means adapted to fix the footplate, for example by means of gluing, bolting or screwing, to the floor of a milking parlour or on the table of a rotary platform; and second attachment means adapted to removably or irremovably attach the foot plate to the positioning device. Advantageously, the foot plate further comprises an aperture to serve as a delivery channel for conduits supplied from under the platform which for example provide treatment chemical, electricity, compressed air, vacuum etc. as required to operate the spray nozzles on the positioning device. The foot plate may be made as a single component or to obtain similar cost reduction and simplified moulding benefits to those described above in relation to the positioning device, a symmetrical design may be made by fitting together two identical components.

BRIEF DESCRIPTION OF THE DRAWINGS

The present invention will now be described with reference to the following drawings in which:
FIGS. 8a and 8b illustrates two examples of the spray pattern that are obtained using the positioning device shown in FIG. 3.

DETAILED DESCRIPTION

Figure 1:
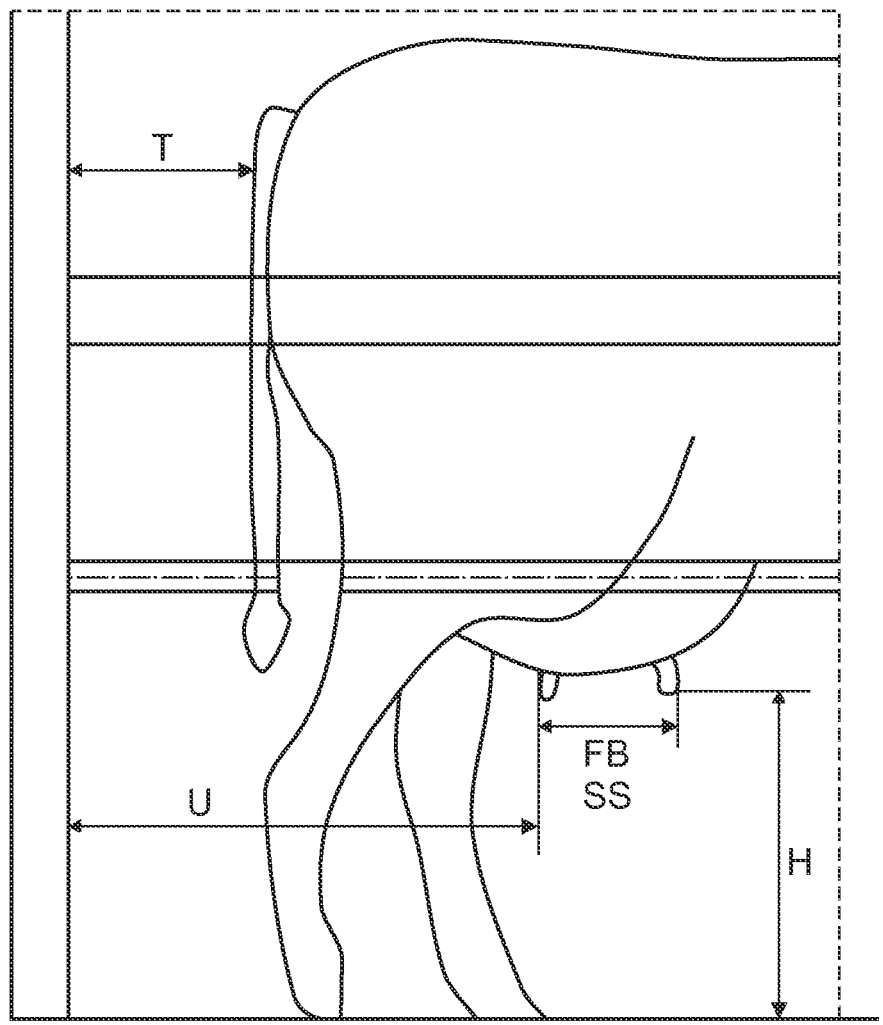
FIG. 1 shows the key dimensions of a cow.
Figure 2:
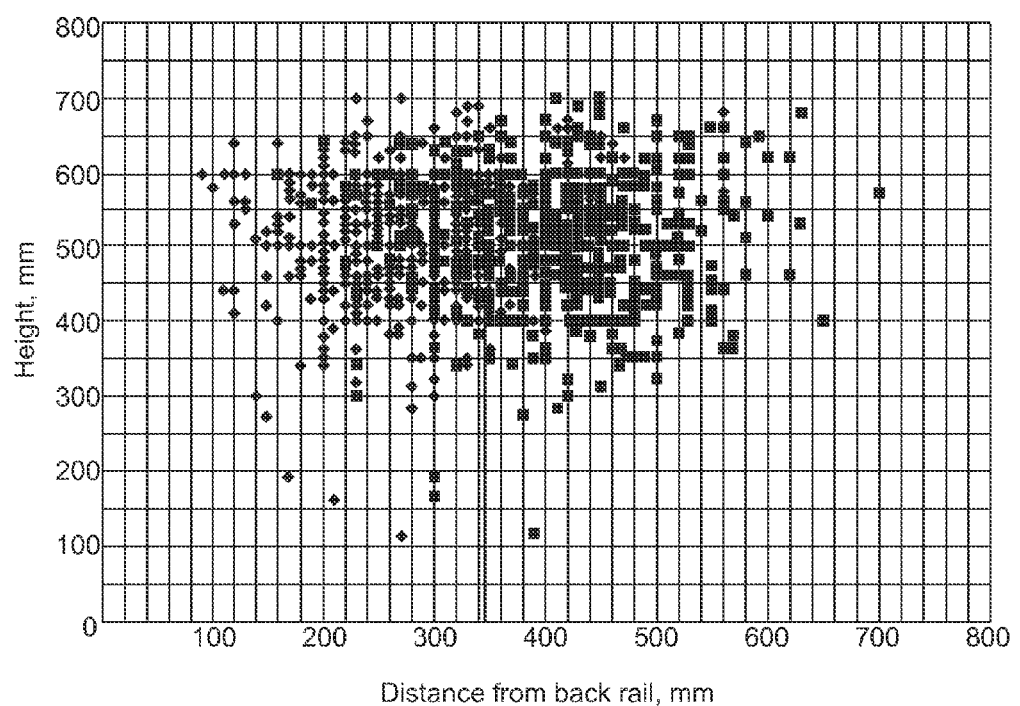
FIG. 2 is a graph showing the distribution of teat positions.

The Applicants have studied the range of teat positions for a sample of 598 cows, to determine the range of teat locations that the teat spray chemical needs to reach. This data was then used to work out the ideal dimensions of the positioning device and the optimum location of spray nozzles. The end result is a positioning device that maximises the number of cows in the population that are adequately treated, which ensures the greatest uniformity of treatment on the teats, and which at the same time minimises the wastage of chemical that misses the teat target. FIG. 1 illustrates the key dimensions of a cow in which:
H=height of the udder
SS=the distance across two rear teats from side to side
FB=distance from front to rear teats
U=distance from the back rail to the rear teats
T=distance the cow stands off the back rail FIG. 2 provides a graphical representation of the distribution of teat positions (side view) as a plot of height in mm (H), against the distance from the back rail, in mm (U) to the tip of the teats. As can be observed, there is a wide variation in teat positions and this needs to be accommodated if effective and efficient spraying is to be achieved.

Figure 3:
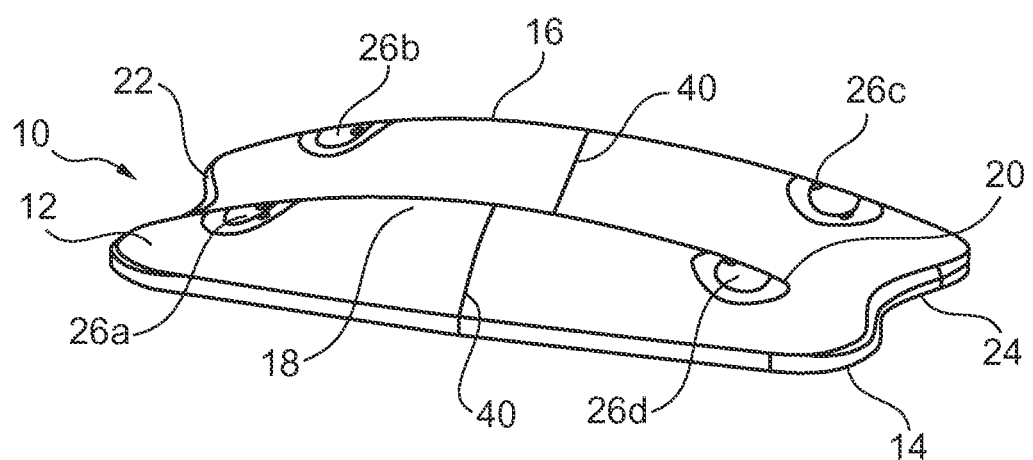
FIG. 3 is a perspective view of a positioning device according to the present invention.

Turning to FIG. 3, this shows a perspective view of a positioning device 10 according to the present invention which has a top surface 12 and an underneath surface 14. The top surface 12 has formed on it a pair of elongate ridge portions 16, 18 which are separated by a central valley region 20 that is common to both ridge portions 16 and 18. The profile of all of the elongate ridge portions 16, 18 and the central valley region 20 is convex in the direction extending between a forward end 22 and a rearward end 24 of the positioning device 10. Four nozzles 26a, 26b, 26c, 26d, are located one towards the forward end and one towards the rearward end of each of the elongate ridge portions 16 and 18. For practical reasons, the nozzles 26a-d, sit slightly proud of the surface of the elongate ridge portions 16 and 18, so as to minimize the risk that they become blocked and contaminated by slurry and excess spray. Positioning device 10 may be associated with activation means (not shown) to activate the spray nozzles 26a-d.

When the positioning device 10 is in use to spray treatment chemical onto animal teats one or more of the spray nozzles can to activated to spray either alone or in any combination. The diagonal spray pattern mentioned above can be achieved for example by activating spray nozzles 26a and 26c to spray as a first diagonal pair and activating spray nozzles 26b and 26d to spray as a second diagonal pair. Alternatively, the spray nozzles can be activated in adjacent pairs, for example 26a and 26b can be activated to spray together and 26c and 26d can be activated to spray together. Further alternatively, the spray nozzles can be paired 26a/26d and 26b/26c.

Figure 4:
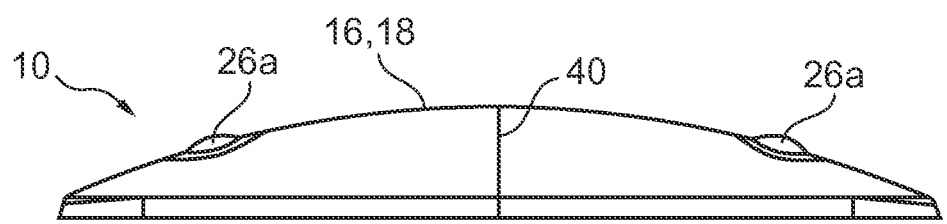
FIG. 4 is a side view of the positioning device shown in FIG. 3.

FIG. 4 is a side view of the positioning device 10 as shown in FIG. 3, and serves to highlight the convex profile of the ridge portions 16,18.

Figure 5:
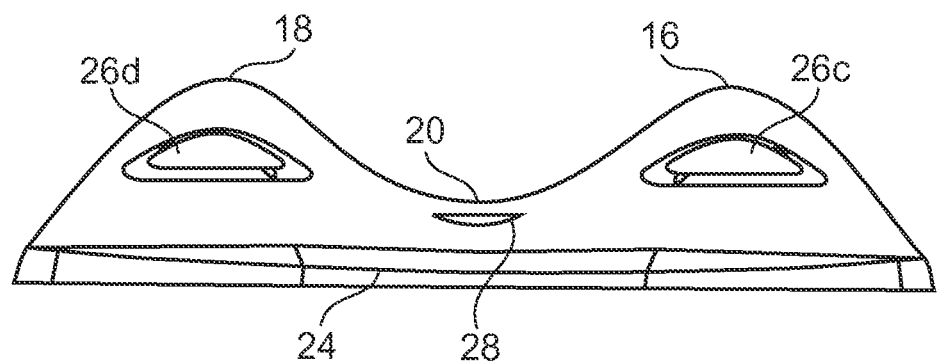
FIG. 5 is an end on view of the positioning device shown in FIG. 3.

FIG. 5 is an end on view of a positioning device 10 according to the present invention and shows fixing means 28 that is used to anchor the positioning device firmly into position at each milking point or milking bail i.e. where each cow stands to be milked. Further fixing means (not shown) may also be provided.

Figure 6:
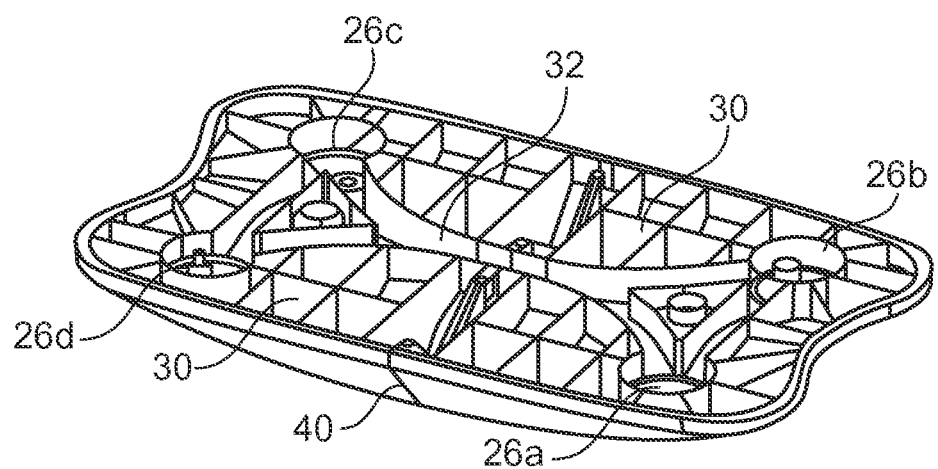
FIG. 6 is a perspective underside view.

The underside of the positioning device 10 is illustrated in FIG. 6 and shows a network of ribs 30 moulded into the positioning device for strengthening purposes, and channels 32 which, in use, guide and provide a recess for the treatment chemical flow tubes (not shown) that convey spray chemical from a remote source (also not shown) to inlet ports on the under side of the spray nozzles 26a-d.

Figure 7:
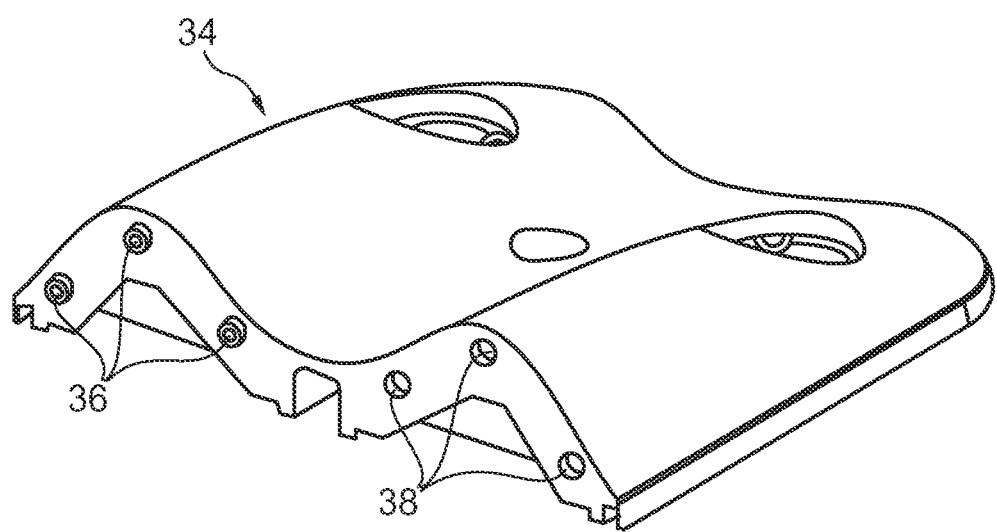
FIG. 7 is a component part for making the positioning device shown in FIG. 3.

FIG. 7 shows a component 34 that provides the positioning device 10 shown in FIG. 3, when fitted together with an identical component 34' (not shown). The first component 34 and second component 34' are fixed together by means of bayonet plugs 36 on the first component 34 which are designed to mate with and push fit into apertures 38' (not shown but identical to apertures 38) on the second component 34'. Similarly, the second component 34' has bayonet plugs 36' (not shown but identical to plugs 36) that are designed to mate with and push fit into apertures 38 on the first component 34. Line 40 shown in FIGS. 3, 4 and 6 indicates the join between the two components, for example 34 and 34'.

Extension sections (not shown) can alternatively be used as joining pieces to link the first and second components 34 and 34' together. This is useful when a longer positioning device is required when dealing with animals with larger udders.

Figure 8C:
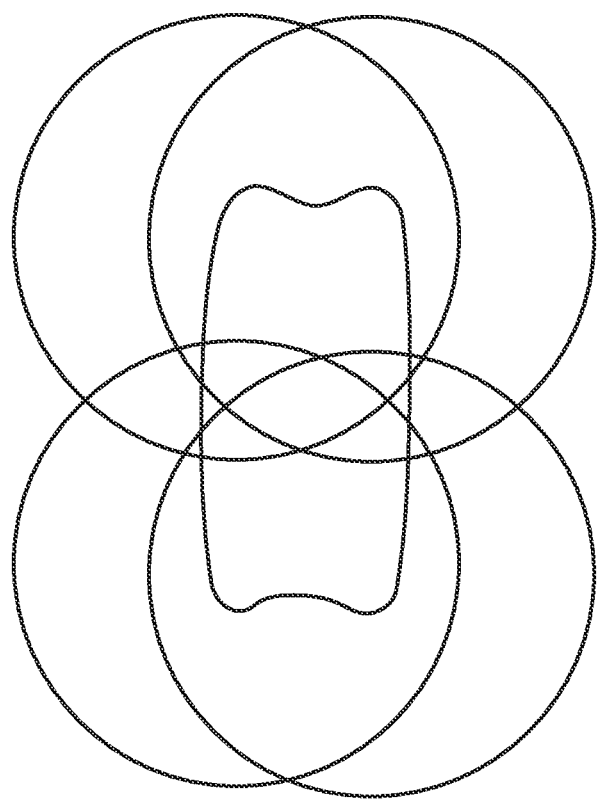
FIGS. 8c and 8d shows a plan view of the spray patterns as illustrated in FIGS. 8a and 8b, respectively.
Figure 8D:
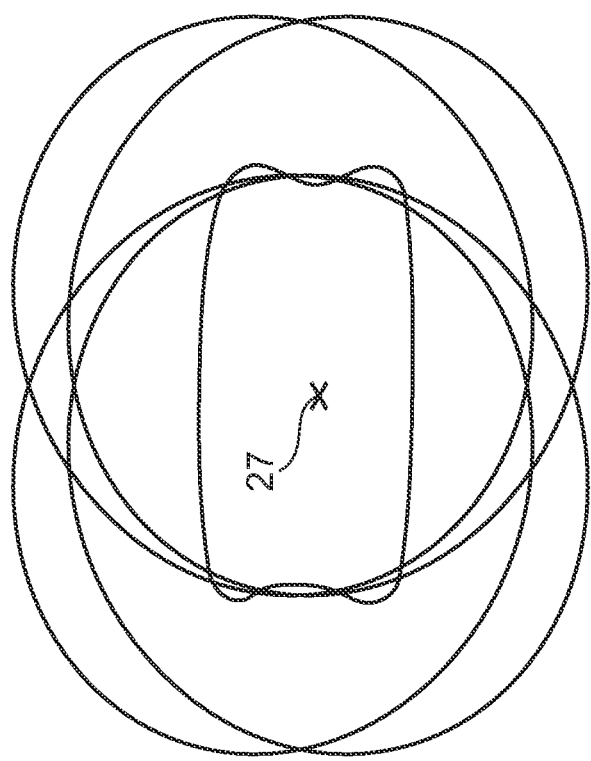

FIGS. 8a and 8b illustrate the solid cone spray pattern that is achieved when all four spray nozzles 26a-d on the positioning device 10 are activated to spray. The spray nozzles may be actuated concurrently and/or consecutively with one another. In the case of FIG. 8a, all four nozzles are oriented to spray directly upwards, i.e. perpendicular to the plane of the top surface 12 of the positioning device 10. The target area of this spray pattern is clearly shown in FIG. 8c as four overlapping circles. In the case of FIG. 8b, all four nozzles 26a', 26b', 26c' and 26d' (26d' is not shown because it is shielded by the spray pattern from nozzle 26c') are oriented to spray at an oblique angle towards the centre 27 of the top surface 12 of the positioning device 10. FIG. 8d illustrates that the target area of this latter arrangement is four overlapping ellipses.

Figure 9:
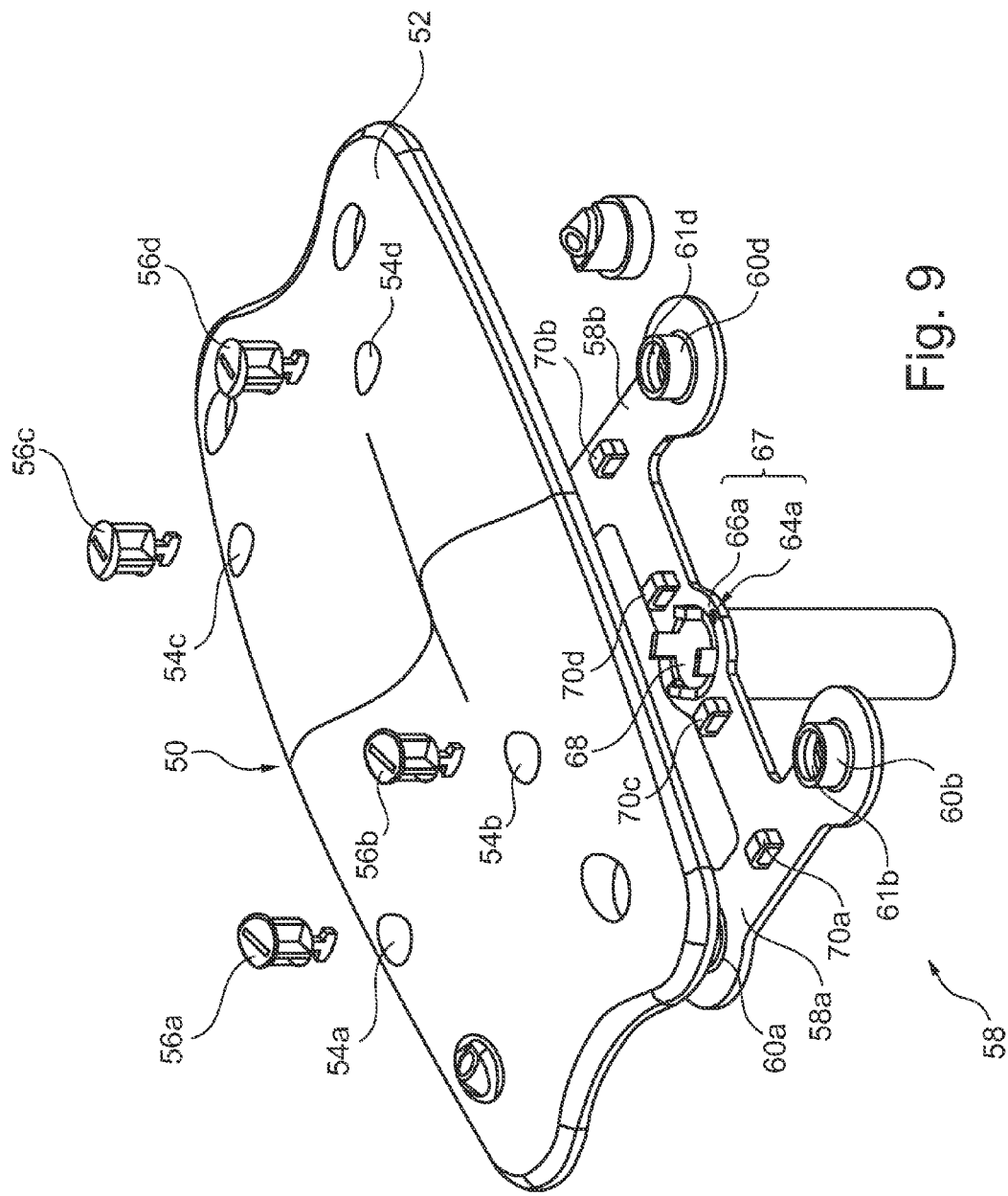
FIG. 9 is an exploded perspective view of a foot plate and positioning device according to the present invention.

FIG. 9 shows an exploded perspective view of a positioning device 50 according to the present invention which is identical in all respects to the positioning device 10 illustrated and discussed with reference to FIG. 3, except that it has on its top surface 52 four apertures 54a, 54b, 54c, 54d each of which is adapted to receive a locking screw 56a, 56b, 56c, 56d respectively. The purpose of the locking screws 56a-d is to attach the positioning device 50 to a footplate 58. The footplate 58 comprises four lock apertures 60a, 60b, 60c, 60d (lock aperture 60c is hidden from view in FIG. 9 by the positioning device 50) each having an elongate slot 61b and 61d (slots 61a and 61c in lock apertures 60a and 60c respectively, are not shown) designed to allow the locking screws 56a-d to be inserted but, following turning the locking screw through 90°, not allow the screws to be removed until they are turned through a further 90°. To attach the positioning device 50 to the foot plate 58, the positioning device 50 is first placed on top of the foot plate 58 so that each aperture 54a-d in the positioning device 50 is aligned with its respective lock aperture 60a-d. A locking screw 56a-d is then inserted into each of the aligned apertures and turned through 90° so as to engage the screw within the elongate slot 61 and to lock the screw into the lock aperture 60, thereby attaching the positioning device 50 to the foot plate 58.

The foot plate 58 as shown in FIG. 9 is formed by joining two identical components 58a and 58b using a linking that has male 64a, (64b not shown) and female 66a, (66b not shown) portions that clip together. The foot plate 58 also includes a delivery channel 68 through which electrical, vacuum, compressed air and fluid service conduits (not shown) pass as necessary to operate the spray nozzles on the positioning device. Mouldings 70a, 70b, 70c and 70d on the surface of the foot plate 58 serve to retain and direct the service conduits (not shown). In use, the foot plate 58 may be attached to the milking platform using screws, bolts or by the application of an adhesive to the underside of the foot plate.

Figure 10:
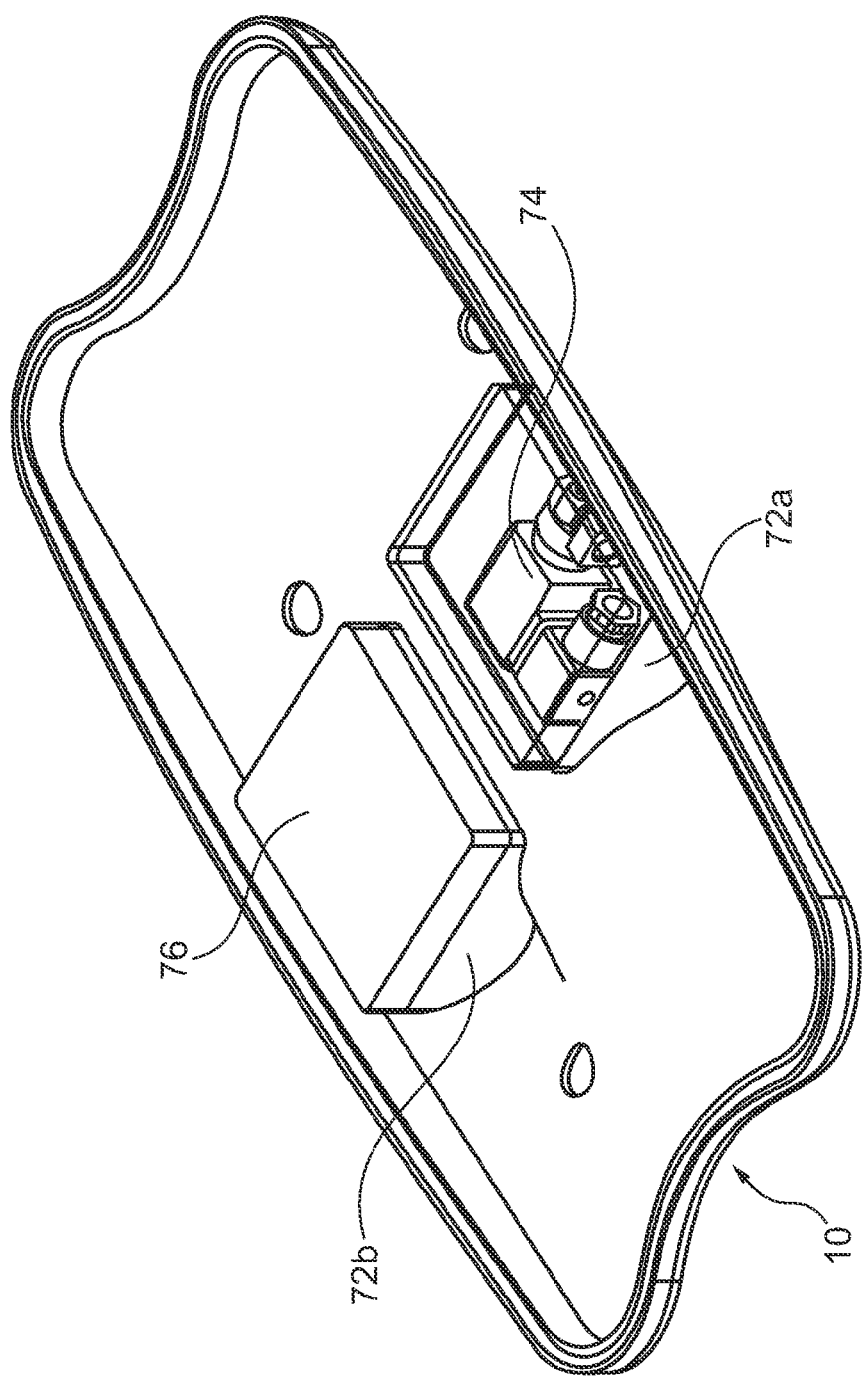
FIG. 10 is a perspective view of the underside of a positioning device with provision to house a solenoid.

FIG. 10 illustrates a perspective view of the underside of the positioning device 10 which is provided with two recesses 72a, 72b within which to house the solenoids 74 (solenoid in recess 72b not visible) needed for the activation of the spray nozzles. A cover 76 is shown to seal recess 72b so as to protect the solenoid inside.

The invention claimed is:

1. A positioning device comprising:
a) a base plate with at least one pair of raised portions upstanding from the base plate and one or more valley regions located between the raised portions of each pair of raised portions, wherein the profile of each of the raised portions, and the profile of one or more of the valley regions, is convex;
b) a first pair of raised portions, a second pair of raised portions and one or more valley regions located between the raised portions in at least one of the first and/or second pair of raised portions, wherein the profile of each of the raised portions and the profile of one or more of the valley regions is convex; and
c) wherein the base plate comprises forward and rearward facing ends and wherein the raised portions comprise a pair of elongated and parallel raised portions which form two raised ridges that run towards the forward facing end in one direction and towards the rearward facing end in the other direction, wherein a valley is located between the two raised ridges and further wherein the profile of each of the two raised ridges and the profile of the valley located between the two raised portions is a convex arc running in the direction between the forward facing and rearward facing end portions.

2. A positioning device comprising:
a) a base plate with at least one pair of raised portions upstanding from the base plate and one or more valley regions located between the raised portions of each pair of raised portions, wherein the profile of each of the raised portions, and the profile of one or more of the valley regions, is convex;
b) one or more spray nozzles, wherein the one or more spray nozzles is located on one or more of the raised portions; and
c) a first pair of raised portions and a second pair of raised portions, wherein one or more spray nozzles is located on one or both of the raised portions in the first pair of raised portions and one or more spray nozzles is located on one or both of the raised portions in the second pair of raised portions.

3. A positioning device comprising:
a) a base plate with at least one pair of raised portions upstanding from the base plate and one or more valley regions located between the raised portions of each pair of raised portions, wherein the profile of each of the raised portions, and the profile of one or more of the valley regions, is convex; and b) two or more spray nozzles, at least one of which spray nozzle is located on a first raised portion positioned towards one end of the positioning device and at least another of which spray nozzle is located on a second raised portion and positioned towards the same end of the positioning device.

4. A positioning device comprising:

a) a base plate with at least one pair of raised portions upstanding from the base plate and one or more valley regions located between the raised portions of each pair of raised portions, wherein the profile of each of the raised portions, and the profile of one or more of the valley regions, is convex;

b) two or more spray nozzles, at least one of which spray nozzle is located on a raised portion positioned towards a forward facing end of the positioning device and at least another of which spray nozzle is located on a raised portion positioned towards a rearward facing end of the positioning device;

c) a common valley region between the raised portions of each pair of one or more pairs of raised portions, wherein at least one nozzle located on a raised portion positioned towards the forward end on one side of the common valley region is adapted to spray either concurrently or consecutively with at least one nozzle located on a raised portion positioned towards the rearward end on the other side of the common valley.

5. A method of spraying the teats of an animal with a treatment liquid comprising the steps:

a) positioning the positioning device according to claim 2 beneath the teats of an animal to be sprayed;

b) providing a source of treatment liquid to the nozzles located on the positioning device; and a) activating two or more nozzles on opposing sides of the valley region to spray in a diagonal spray pattern.

* * * * *